(No Model.)
G. W. TOWLE, Jr.
HOSE PATCH.
No. 294,937.  Patented Mar. 11, 1884.
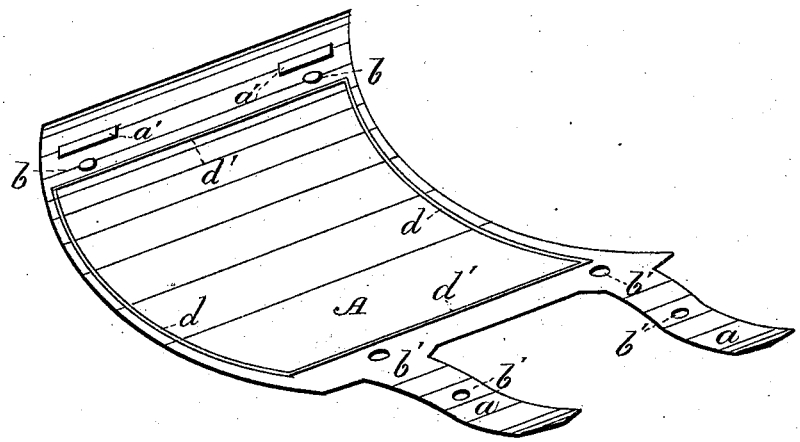
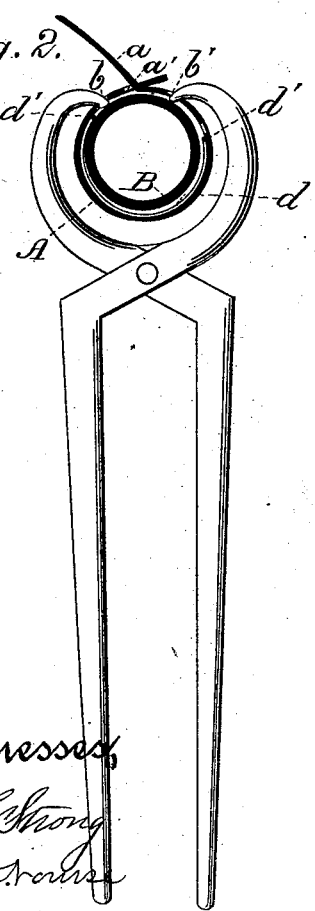
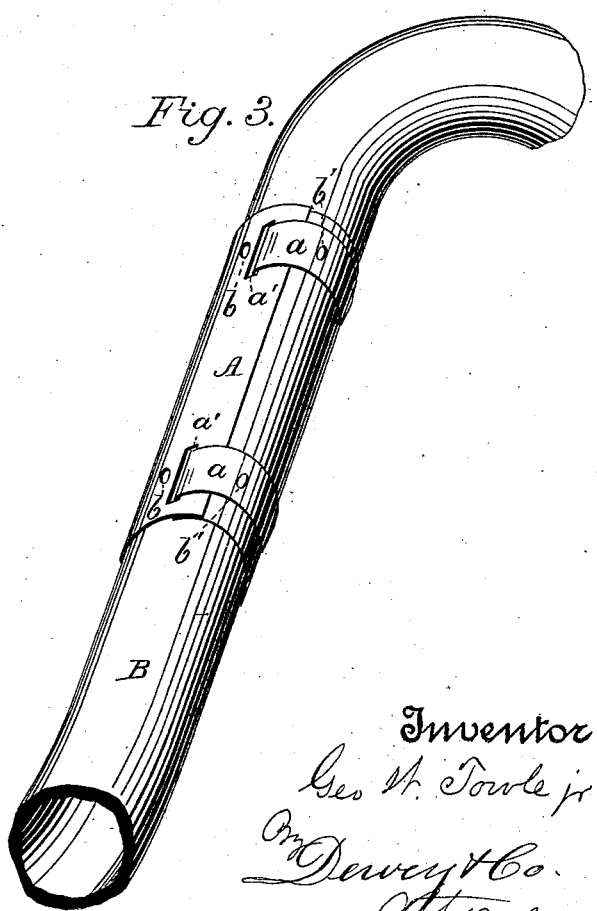
Witnesses
Inventor
Geo. W. Towle jr
Dewey & Co.
Attorneys

UNITED STATES PATENT OFFICE.

GEORGE W. TOWLE, JR., OF SAN RAFAEL, CALIFORNIA.

HOSE-PATCH.

SPECIFICATION forming part of Letters Patent No. 294,937, dated March 11, 1884.

Application filed April 30, 1883. (No model.)

*To all whom it may concern:*

Be it known that I, GEORGE W. TOWLE, Jr., of San Rafael, county of Marin, State of California, have invented an Improved Hose-Patch; and I hereby declare the following to be a full, clear, and exact description thereof.

My invention relates to a novel hose-patch for mending a leak in hose; and it consists in a circumscribing band provided with ribs on its inner sides, and means for adjusting and securing it, as will be fully explained, reference being made to the accompanying drawings.

Figure 1 is a perspective view of my hose-patch opened out. Fig. 2 is a transverse section, showing the manner and means of its application to a hose. Fig. 3 is a perspective view, showing the patch secured upon a hose.

A is a metal plate, bent in the form of a band around a hose, B, at a point where it is broken and leaks. One edge of this band is provided with tongues $a\ a$ at each end, which fit through corresponding slots, $a'\ a'$, in the opposite edge. Back of these slots are made holes $b$, while holes $b'$ are made in the tongues. Of these holes there may be as many as desired, to enable one to set up the band, as follows: When this band has been fitted around the hose, so that it shall cover the leak therein, and the tongues passed through the slots, some pressure must be brought upon the band in order to bring its edges closer together and to compress the hose in order to make a close fit. This cannot well be done by the hand, so I have made the holes $b\ b'$ to permit the use of a pair of common pinchers, which are shown in Fig. 2. The jaws of these pinchers embrace the band from below, one point entering hole $b$ and the other one of the holes $b'$. Pressure upon the pinchers then forces the edges of the band together. If the adjustment requires further pressure, the point of the pinchers is freed from the hole $b'$, in which it was, and inserted in the one back of it, when the band may be more closely adjusted. This is the object of the series of holes in the tongues. The points of the pinchers coming from below or behind do not interfere with turning the tongues back, in order to lock them when the band has been compressed sufficiently, Fig. 3. There is an object in having these locking devices, one at each end of the band or patch. Breaks in hose are generally slits having appreciable length. By having a clamp at each end of the patch the hose is compressed at each end of the slit, to prevent any further splitting of the hose, and to effectually stop the leak. This would not be the case if but a single central clamp were used, as the greatest pressure would be on the center of the slit, causing its ends to gap, rather than close; but two clamps, one on each side, completely close the slit by compressing the hose at each end as well as in the middle.

Upon the inner surface of the band A, near its edges, are formed cross-ribs $d$ and longitudinal ribs $d'$. These, when the band is set up, are pressed into the flexible hose, and together form a kind of boundary or guard all around the slit where the leak is.

The longitudinal ribs are quite useful, as they serve to guard the weakest points on the band—namely, the edges between the tongues. The cross or circular ribs merely supplement the tongues in guarding the ends of the patch. These bands will preferably be stamped out of sheet metal, and it will be an easy matter to make the entire patch at a single operation.

Having thus described my invention, what I claim as new, and desire to secure by Letters Patent, is—

1. A hose-patch consisting of the band A, having tongues $a\ a$ and slots $a'\ a'$, whereby it may be adjusted around the hose and locked, and having the longitudinal ribs $d'$ on its inner surface, near its edges, substantially as and for the purpose herein described.

2. A hose-patch consisting of the band A, having tongues $a\ a$ and slots $a'\ a'$, whereby it may be adjusted around the hose and locked, and having the longitudinal ribs $d'$ and the cross-ribs $d$ on its inner surface, substantially as and for the purpose herein described.

In witness whereof I hereunto set my hand.

GEORGE W. TOWLE, JR.

Witnesses:
WM. F. BOOTH,
J. H. BLOOD.